United States Patent [19]

Meyer

[11] Patent Number: 4,735,085

[45] Date of Patent: Apr. 5, 1988

[54] FLOW MEASUREMENT DEVICE UTILIZING FORCE TRANSDUCERS

[75] Inventor: Rudolph C. Meyer, Palos Verdes Estates, Calif.

[73] Assignee: Grumman Aerospace Corporation, Bethpage, N.Y.

[21] Appl. No.: 898,682

[22] Filed: Aug. 21, 1986

[51] Int. Cl.⁴ .................. G01C 21/00; G01M 9/00
[52] U.S. Cl. .......................... 73/147; 73/180; 73/188
[58] Field of Search ............ 73/180, 147, 188, 189

[56] References Cited

U.S. PATENT DOCUMENTS

| | | | |
|---|---|---|---|
| 2,782,636 | 2/1957 | Peucker | 73/147 |
| 2,855,779 | 10/1958 | Zaid | 73/180 |
| 3,105,382 | 10/1963 | Friedman et al. | 73/180 |
| 3,224,265 | 12/1965 | Mazelsky et al. | 73/147 |
| 3,398,266 | 8/1968 | Willis | 73/147 |
| 3,447,369 | 6/1969 | Horanoff | 73/147 |
| 3,572,618 | 3/1971 | Willett | 244/77 |
| 3,960,000 | 6/1976 | Barnett et al. | 73/147 |
| 3,964,306 | 6/1976 | Fletcher et al. | 73/147 |
| 4,435,695 | 3/1984 | Maris | 73/147 |

*Primary Examiner*—Donald O. Woodiel
*Attorney, Agent, or Firm*—Pollock, VandeSande & Priddy

[57] ABSTRACT

A missile-shaped body is calibrated to determine characteristic influence coefficients. Thereafter, the body is positioned in a flow field where normal forces and pitch moments are measured. Due to the fact that influence coefficients are predetermined as a result of calibration, the force and moment measurements are used to solve equations for flow field angularity.

5 Claims, 2 Drawing Sheets

FLOW MEASUREMENT DEVICE UTILIZING FORCE TRANSDUCERS

RIGHTS OF THE GOVERNMENT

The Government has rights in this invention pursuant to Contract No. F33615-82-C-3007 awarded by the Department of the Air Force.

FIELD OF THE INVENTION

The present invention relates to flow measurement devices, and more particularly to a flow direction instrument utilizing force transducers.

BACKGROUND OF THE INVENTION

In a host of applications, flow direction measurements are necessary. For example, aboard modern fighter aircraft, it is necessary to measure angle of attack that conventionally involves the utilization of a vane which is responsive to air streams across its surface for sensing angle of attack. Similar vane instruments are employed in other airflow measurements such as wind direction and hydraulic flow.

Although such devices often operate satisfactorily, their mechanical nature involves inherent disadvantages. One of these disadvantages is the inherent problem of unreliability in adverse environments. Minor deterioration in mechanical components will adversely affect the data being generated by vane instruments. Further, such vane instruments are exceedingly sensitive to turbulence or extraneous air streams in the vicinity where they are mounted so as to sense flow components that are not of interest. An additional disadvantage is the lag time for responding to quick changes in flow direction.

BRIEF DESCRIPTION OF THE PRESENT INVENTION

The present invention corrects the aforementioned disadvantages and may be utilized in a wide variety of flow measurements, including air and liquid environments.

Rather than relying upon mechanical vane transducers, the present invention utilizes electric strain gauges for reacting to forces imposed upon an instrument body positioned in a fluid stream for which flow direction is to be measured. Accordingly, the present instrumentation offers the advantage of highly reliable and rapidly responsive electronics for sensing changes in flow direction.

In the specific application where the present invention is to be employed as a flow direction measuring device for a fighter aircraft or missile, it may be easily fastened to the fuselage of such a vehicle for providing more dependable and precise data than is available with the prior-discussed conventional vane devices.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE PRESENT INVENTION

The fundamental assumption underlying the present invention is that an ogive cylinder's (missile-shape) normal force and moment in a nonuniform flow can be correlated with the angle-of-attack distribution along the length of the cylinder. Assume that the ogive cylinder in question is conceptually divided into "N" equal length segments extending from the nose to the base. The normal force coefficient, $C_N$ and moment coefficient, $C_m$, for the ogive cylinder body in a nonuniform flow field is related to the angle-of-attack distribution along the ogive cylinder body as follows:

$$C_N = \sum_{i=1}^{N} A_i (\alpha - \alpha_0)_i \quad (1)$$

$$C_m = \sum_{i=1}^{N} B_i (\alpha - \alpha_0)_i + C_{mo} \quad (2)$$

where
$C_N$ = normal force coefficient for ogive cylinder defined as:

$$C_N = \frac{\text{(Normal Force acting on ogive cylinder)}}{\text{(dynamic pressure of the ambient flow)} \times \text{(Reference area } S\text{)}}$$

$$C_m = \frac{\text{(Moment acting on ogive cylinder)}}{\text{(dynamic pressure of the ambient flow)} \times (s) \times \text{(Reference length } d\text{)}}$$

S = a reference area, usually selected to be the ogive cylinder cross-sectional area;
d = a reference length, usually selected to be the ogive cylinder diameter;
$A_i = C_N$ influence coefficient for $i^{th}$ element;
$B_i = C_m$ influence coefficient for $i^{th}$ element;
$\alpha_i$ = local $\alpha$ (flow angle) at $i^{th}$ element;
$\alpha_0$ = isolated $\alpha$ for zero lift;
$C_{mo}$ = isolated zero lift pitching moment.

If the intended application is to measure flow direction in situations where the flow angularity does not change significantly over the length of the ogive cylinder, then the ogive cylinder need only be divided into one length element, i.e., N=1. If the intended application is to measure flow direction in situations where the flow angularity varies significantly over the length of the ogive cylinder, then the ogive cylinder may be considered to be divided into N elements (where N>1 up to a maximum of approximately L/d where L=the ogive cylinder length and d=the diameter).

Figure 1:
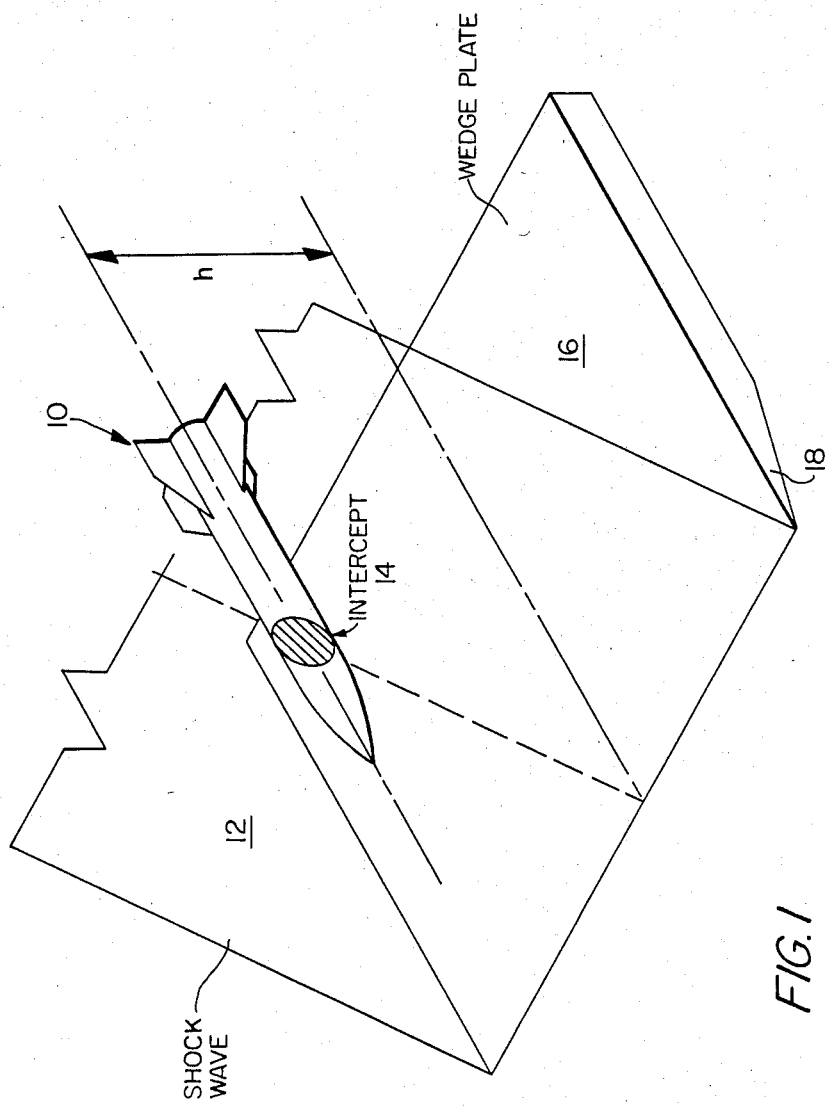
FIG. 1 is a schematic representation of a calibration test set-up for determining influence coefficients for an ogive body.

The influence coefficients are determined by the particular contour of an ogive cylinder. At suspersonic speeds, the influence coefficients A and B can be determined experimentally by traversing an ogive cylinder through an oblique shock wave generated by a wedged plate, as shown in FIG. 1. The calibration test set-up in FIG. 1 illustrates the ogive cylinder generally indicated by reference numeral 10 encountering oblique shock wave 12 through an angled intercept intersection 14. The shock wave may be generated employing an inclined surface 18, for example the extended plate 16 with a wedge leading edge.

Each of the $i^{th}$ elements indicated for the above equations represents a distance along the length of the ogive cylinder and, as will be appreciated from the equations, the influence coefficients vary as a function of such distance elements. The flow angle alpha for purposes of calibration represents the flow angle as determined by the shock wave.

In order to calculate influence coefficients from the above equations, $C_N$ and $C_m$ may be expressed as follows:

$$C_N = N/qs \tag{3}$$

$$C_m = m/qsd \tag{4}$$

$$q = \rho v^2/2 = \text{ambient flow dynamic pressure} \tag{5}$$

where
M is the magnitude of the measured movement;
N is the magnitude of the measured force;
s is equal to the selected reference area;
d is equal to the selected reference length;
$\rho$ is equal to density of air;
v is equal to the relative velocity of ogive cylinder 10 (FIG. 1).

As a result of calibration, since the flow angularity $\alpha$ and the normal force N and moment m are known, the influence coefficients $A_i$ and $B_i$ can be determined. The influence coefficients $A_i$ and $B_i$ can also be determined by theoretical analysis for some simple instrument body shapes such as the ogive cylinder example discussed above.

The known influence coefficients, in conjunction with normal force and moment data may then be used for solving equations (1) and (2) for alpha when the ogive cylinder is subjected to a "real world" fluid flow of unknown angularity. Thus, once an ogive cylinder has been calibrated, it may be utilized to detect flow angle as is presently done by the less advantageous mechanical vanes previously discussed.

Figure 2:
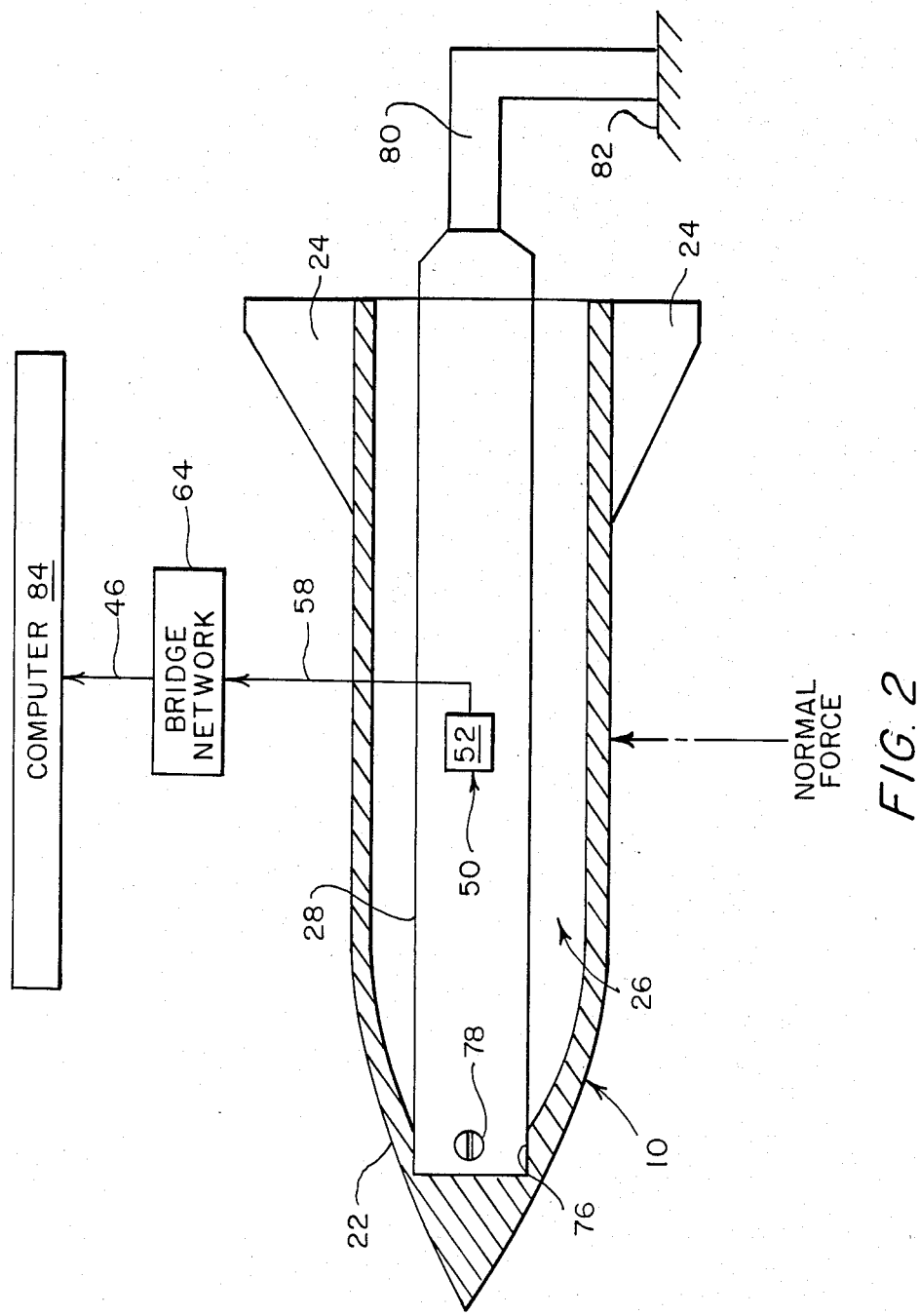
FIG. 2 is a partial cross-sectional schematic representation of a flow field angularity measurement device constituting the present invention.

In order to measure normal force and pitching moment at various distances along the length of an ogive cylinder, the cylinder is equipped with strain gauge instrumentation as illustrated in FIG. 2.

The ogive cylinder 10 includes a hollowed fuselage 22 and rear fins 24. An axially positioned and rod-like strain gauge assembly 28 extends longitudinally along the length of the fuselage 22 and creates an annular space 26 between the strain gauge assembly and confronting surface of fuselage 22. The strain gauge assembly 28 is supported at only the front and rear ends thereof to the fuselage 22.

As indicated in FIG. 2, the strain gauge assembly comprises a conventional five-component strain gauge balance 52 located at a central point 50 along the length of fuselage 22. This single centrally located strain gauge feeds its output signals along line 58 to a bridge network 64. The output signals from the bridge network, along line 46, measure pitch, roll and yawing moments as well as normal and side forces allowing determination of flow angularity in the longitudinal and lateral planes of the cylinder, as well as the swirl angle associated with the rolling moment measurement.

The forward end of the rod-like strain gauge body 28 is received within a cylindrical recess 76 formed within the fuselage 22 and is appropriately fastened thereto by fasteners 78. The rear end of the strain gauge body 28 is supported by means of an L-shaped bracket 80, or the like, to a fixed surface 82.

When the device shown in FIG. 2 is to be employed as a flow direction instrument, it is positioned in a flow stream and readings are taken at the output of bridge network 64. The data generated by the bridge network is fed to a conventional computer 84 for solving equations (1) and (2) for flow field angularity alpha.

In the event that the device shown in FIG. 2 is to be employed as an angle of attack sensor for fighter aircraft or missiles, the device would be mounted at 82 to the fuselage of the fighter aircraft or missile. In such a situation, solution of equations (1) and (2) for $\alpha$ will yield the angle of attack. In this application the primary five-component strain gauge balance that meaures the aerodynamic force and moment acting on the instrument body external shell would be complemented by another five-component strain gauge balance that measures the acceleration forces and moments on an internally mounted reference mass having inertia characteristics similar to the external instrument body. These acceleration forces and moments would be used to correct the primary balance measurements to compensate them for the acceleration forces experienced by the external instrument shell.

It is to be understood that the present invention is intended to have general applicability to flow field angularity measurement in a wide variety of fluids, including air and other gases as well as liquid flow streams. Also, the invention is not limited to the exact details of construction shown and described herein, for obvious modifications will occur to persons skilled in the art. For example, bodies other than ogive cylinders may be employed as long as they have a generally aerodynamic shape and their influence coefficients are determinable.

I claim:

1. A flow direction sensor comprising:
    an aerodynamic body characterized by predetermined influence coefficients dependent upon the shape of the body;
    a strain gauge assembly located within the body for measuring forces and moments when the body is subjected to a flow field;
    thereby enabling the calculation of flow angle as a function of the influence coefficients;
    the strain gauge assembly including a continuous rod having a first end fixed within the interior of the body and an opposite end portion thereof being suspended within the interior.

2. A fluid flow direction system comprising:
    an aerodynamic body characterized by predetermined influence coefficients dependent upon the shape of the body;
    a continuous rod having a first end fixed within the interior of the body and an opposite end portion thereof being suspended within the interior;
    strain gauge means connected to the rod for measuring corresponding forces and moments on the body when the body is subjected to a flow field;
    circuit means connected to the strain gauge means for producing electrical signals dependent upon the force and moment encountered; and
    means connected to the circuit means for computing fluid flow angularity as a function of the encountered forces and moments on the body.

3. The structure set forth in claim 2 wherein the strain gauge means comprises a normal force and pitching moment gauge and, as required, a side force and yawing moment gauge.

4. The structure set forth in claim 3 wherein the circuit means comprises a bridge network having separate inputs connected to the respective strain gauge members.

5. A method for determining fluid flow direction, the steps comprising:
- determining the influence coefficients along distance elements of a body, having preselected aerodynamic shape, in response to a flow field angle and measurable forces and moments exerted on the instrument body during calibration;
- subjecting a body of the same shape to an actual flow field to be measured;
- measuring the force and moment encountered on the body as a result of the fluid flow across the body; and
- determining the flow field angle as a function of the influence coefficients as well as the measured forces and moments;
- wherein the flow field angle is determined from the relationships:

$$C_N = \sum_{i=1}^{N} A_i (\alpha - \alpha_0)_i \tag{1}$$

$$C_m = \sum_{i=1}^{N} B_i (\alpha - \alpha_0)_i + C_{mo} \tag{2}$$

where
$A_i = C_N$ influence coefficient for $i^{th}$ element;
$B_i = C_m$ influence coefficient for $i^{th}$ element;
$\alpha_i =$ local $\alpha$ (flow angle) at $i^{th}$ element;
$\alpha_0 =$ isolated $\alpha$ for zero lift;
$C_{mo} =$ isolated zero lift pitching moment.

* * * * *

UNITED STATES PATENT AND TRADEMARK OFFICE
CERTIFICATE OF CORRECTION

PATENT NO. : 4,735,085
DATED : April 5, 1988
INVENTOR(S) : Rudolph C. Meyer

It is certified that error appears in the above-identified patent and that said Letters Patent is hereby corrected as shown below:

Column 1, bridging lines 45 and 46, change "transucers" to --transducers--.

Column 2, line 58, change "suspersonic" to --supersonic--.

Column 3, line 48, change "extends" to --extend--.

Signed and Sealed this

Twenty-third Day of August, 1988

Attest:

DONALD J. QUIGG

Attesting Officer
Commissioner of Patents and Trademarks